April 7, 1936.  W. A. TOLSON  2,036,444
PHASE INDICATOR
Filed Dec. 29, 1934   3 Sheets-Sheet 1

INVENTOR:
William A. Tolson,
BY T. R. Goldsborough
ATTORNEY.

April 7, 1936.　　　W. A. TOLSON　　　2,036,444
PHASE INDICATOR
Filed Dec. 29, 1934　　　3 Sheets-Sheet 2

INVENTOR
William A. Tolson
BY T. R. Goldsborough
ATTORNEY

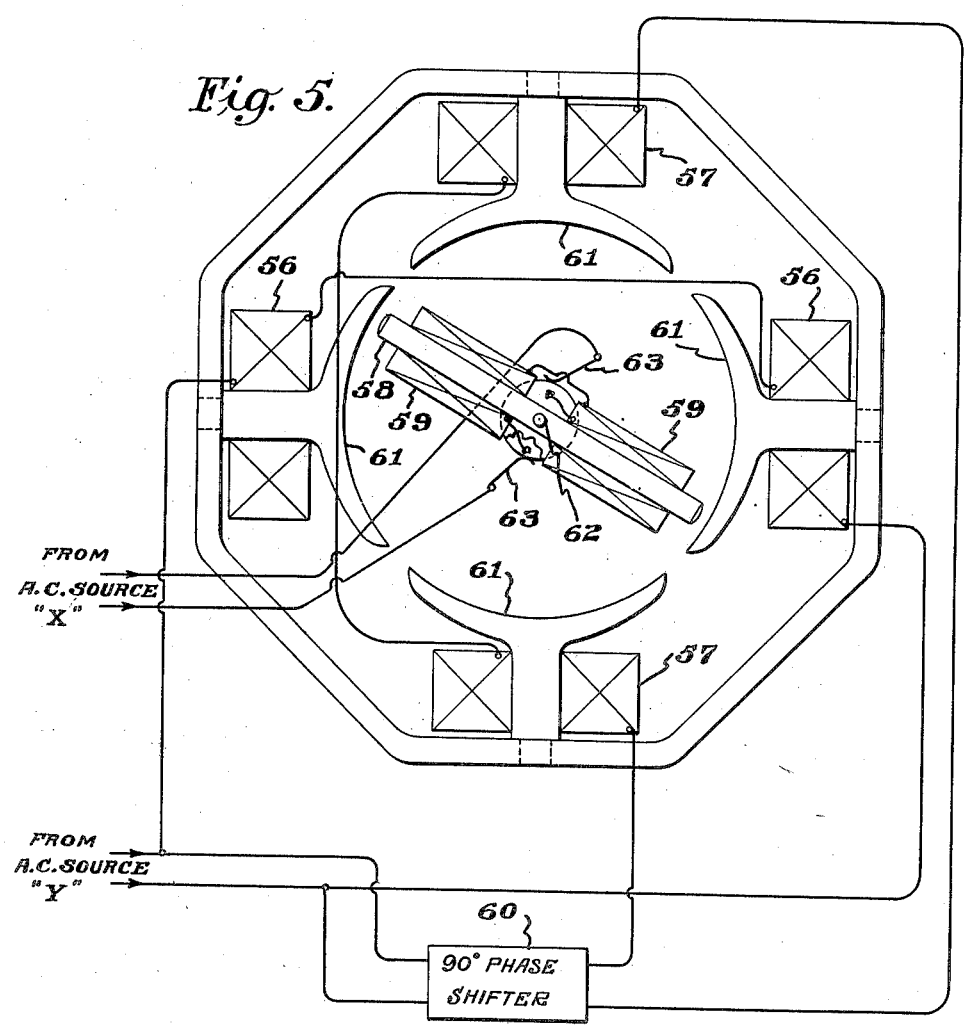

Patented Apr. 7, 1936

2,036,444

UNITED STATES PATENT OFFICE 2,036,444

PHASE INDICATOR

William A. Tolson, Westmont, N. J., assignor to Radio Corporation of America, a corporation of Delaware Application December 29, 1934, Serial No. 759,670

7 Claims. (Cl. 172—245)

This invention relates to phase indicators and has particular reference to instruments which may be found useful in measuring phase angles between two currents. One application of the invention is in connection with earth inductor compasses, radio beacons, and the like. Another application is found in electrical laboratory work where it may be desired to indicate the phase relation between alternating currents from any two sources.

In my application Serial No. 750,631 filed October 30, 1934, it is shown that earth inductor compasses may be so constructed as to utilize the effects of an alternating current induced in a rotor which is adapted to cut the lines of force of the earth's magnetic field. In that application I showed a cathode ray tube as one of the elements of the direction indicator. I also showed a modified indicator operative according to stroboscopic principles. In contrast therewith I show in the instant application an embodiment (with modifications) of an indicator having a pointer which may be physically oriented with respect to a circular scale, or any other suitable dial, thereby to give a desired indication of phase angle relationship between two alternating currents of substantially the same frequency. The same apparatus may also be used to measure an angle between the axis of a magnetic field and the longitudinal axis of a ship or other carrier on which the instrument is mounted.

It is among the objects of my invention to provide a phase indicator which is extremely sensitive and which possesses a positionable pointer having very small mass; also to provide an instrument which in other respects fulfills the requirements of efficient design and convenience of operation.

In carrying out my invention I may, if desired, connect my indicating instrument as herein shown in any of its embodiments to an impulse generating network, such as shown in my aforementioned copending application. Otherwise, the indicating instrument may be connected to any two alternating current sources the phase angle relationship between which it is desired to observe. It is contemplated that in the use of apparatus of the type herein disclosed it will be preferable, for the sake of accuracy of the indications, to obtain very sharply peaked impulses in respect to one at least of the alternating currents. The means for doing this was shown in my aforementioned copending application and is shown again in the instant application.

In the drawings which constitute a part of the specification,

Fig. 5 shows diagrammatically still another embodiment.

Figure 1:
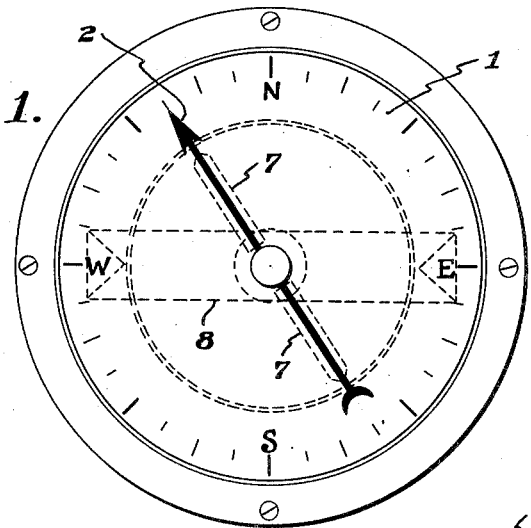
Figure 1 is a front view of a phase indicator having a suitable pointer and dial.
Figure 2:
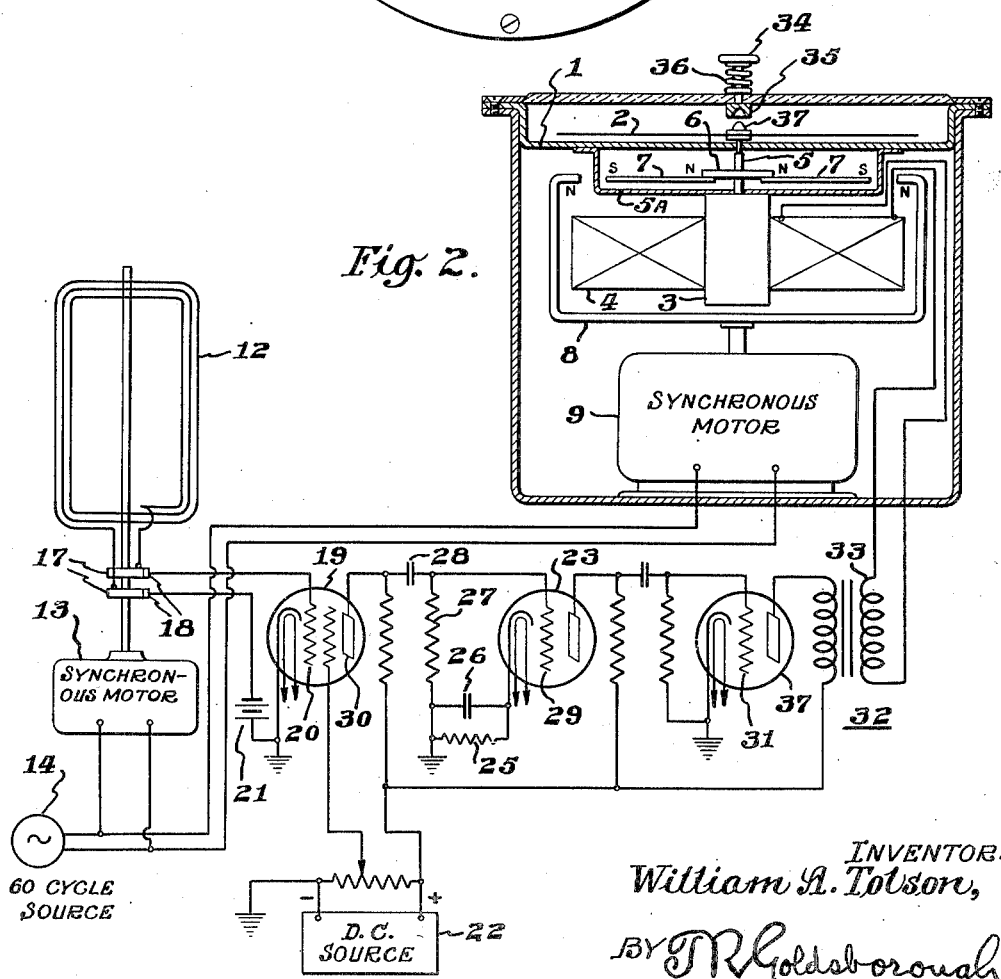
Fig. 2 shows partly in cross-section and partly diagrammatically one embodiment of my phase indicator in association with an earth inductor compass system.
Figure 3:
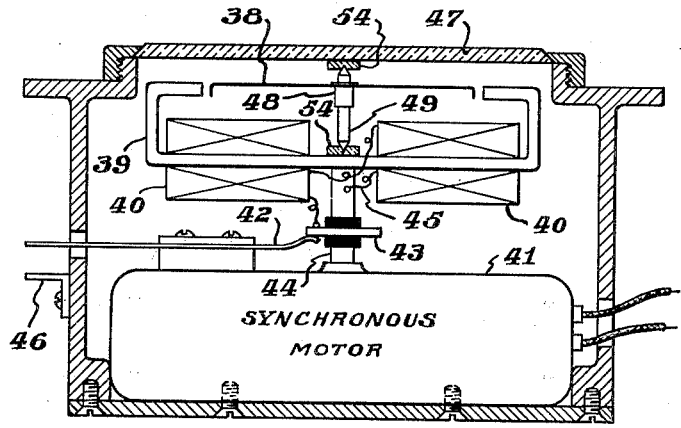
Fig. 3 shows in cross-section a slight modification of the indicating instrument of Figs. 1 and 2.

Referring to Fig. 1, I show an indicator dial 1 which may, if desired, be graduated as a compass chart. Manifestly it could be graduated in degrees, if desired. A pointer 2 is centered over the compass chart and adapted to take up a position which is determined by the action of certain magnetic elements positioned below the dial face, say as indicated in Fig. 2. The compass pointer or needle 2 may be made of any suitable material. It is not intended to be magnetized or even magnetic, if it is to have associated therewith magnets 7 as shown in Fig. 2. In certain instances, however, it may be made magnetic, particularly, if used as shown in Fig. 3. The pointer and dial as shown in Fig. 1 may be used as components of any of the embodiments shown in the remaining figures.

In the embodiment of my phase indicator shown in Fig. 2, there is mounted below the dial face 1 a magnet having a core 3 and winding 4, this magnet being coaxially disposed with respect to the spindle 5 of the compass needle. The magnet 3, 4 is stationarily mounted on a supporting member 5A which may be fastened to the underside of the dial face 1. The spindle 5 has pivot bearings at both ends, the bottom end being supported either by the member 5A, or, if a sufficient clearance hole is made in the member 5A, by a bearing formed in the end of the core member 3.

The spindle 5, in addition to carrying the indicator needle 2, has also mounted thereon a nonmagnetic support 6 on which are carried two small permanently magnetized bars 7. The ends of these magnetized bars near the center of rotation are of like polarity. A fixed relation is maintained between the magnets 7 and the indicator pointer 2. The spindle 5 is free to rotate in its bearings. Hence, it requires only a suitable directional control of the magnets 7 to produce any desired phase indication. Such a control may be had if a sharply peaked impulse is impressed upon the stationary magnet 3, 4 while its armature 8 is continuously rotated. For this purpose I provide preferably a synchronous motor 9 on the shaft of which the armature 8 is carried. The armature should preferably be of such material that it may be quickly magnetized and demagnetized in accordance with the magnetizing force of the coil 4.

Assuming that a directional indication is to be made, the determination of which has reference to the direction in which the vessel carrying this indicator is headed, it is then possible during every cycle of the alternating currents used to energize the magnet coil 4 and hence the armature 8 at a particular instant when the armature is aligned with the direction to be indicated. At this instant the magnets 7 will be drawn into parallelism with the straight magnetic path across the two like poles of the armature 8. During the remainder of its revolution the armature 8 will be deenergized, since the current through the magnet 4 is only momentary. The needle magnets 7 will, therefore, tend to remain in the position to which they were attracted.

For the sake of completeness in the instant disclosure of my phase indicator I have exemplified its utility in connection with an earth inductor compass such as shown in my aforementioned copending application. I will now review a portion of the description of the impulse generating network which was disclosed in that application.

A coil 12 may be rotated in the earth's magnetic field by means of a small synchronous motor 13, the power for which may be derived from the same source as that which drives the synchronous motor 9. If the vessel on which the compass system is carried changes its direction, it is manifest that a like change will take place in the phase relationship between the current of the 60-cycle source shown at 14 and the alternating current induced by the coil 12. The phase variation results from the orientation of the field of the synchronous motor 13 with respect to the compass points when the course of the vessel is changed.

The earth's magnetism induces a small alternating current in the coil 12, the frequency of the current being dependent upon the speed of rotation of the coil. One complete revolution of the coil generates one complete cycle of alternating current. By means of collector rings 17 and brushes 18 this current may be taken off and applied, say, across the grid and cathode leads of an amplifier tube 19. The grid 20 may, if desired, be suitably biased by means of the battery 21. Anode and screen grid potentials may be supped from the source 22. The amplifier tube 19 may then be caused to function in the usual manner. More than one stage of amplification may be provided, if desired.

The intercoupling between stages may be either by means of transformers or by the usual form of resistance coupling, as is well known in the art. In this instance I have illustrated a suitable network comprising the electron tubes 19, 23 and 37, each of which serves a different purpose. The tube 23 normally draws very little current. One way of producing this result is to introduce between the cathode 24 and ground a high resistor 25, say, of the order of one megohm. This resistor is preferably shunted by a capacitor 26 permitting momentary currents of larger amplitude to flow. The grid circuit includes a resistor 27 and is coupled by means of a capacitor 28 to the output circuit of the tube 19.

The tube 19 provides substantially linear amplification of a sine wave current. When a maximum voltage is developed on the anode 30 a positive wave peak will then be applied across the capacitor 28 to the grid 29 which raises its potential just above the cut-off point due to the fact that this grid is normally very negatively biased by the resistors 25 and 27. A very sharply peaked impulse is, therefore, transmitted by the tube 23, this impulse being developed into a space current of suitable amplitude (aided by the low impedance of the capacitor 26) for suddenly lowering the plate potential and biasing the grid 31 of the tube 37 below its cut-off point.

Normally, the grid 31 may be so biased that a current of suitable amplitude will flow in the tube 37, thereby developing a more or less saturated magnetic flux in the core of the transformer 32. If the tube 37 becomes suddenly blocked, as when its grid momentarily goes negative, it will be seen that the stored energy in the transformer 32 must be dissipated through its secondary winding 33. It is possible in this manner to develop a suitable potential for impress upon the magnet coil 4. It will thus be seen that this magnet and its armature 8 are energized for a sufficiently brief interval to accurately determine the position of the pointer 2.

In case for any reason the pointer were to be reversed in its directional indication, the reversed position would be maintained because of the like polarity of the outer ends of the two magnets 7. To obviate this difficulty I provide a push button 34, having at the lower end of its spindle a cup shaped bushing 35. A coil spring 36 may be used to hold the bushing 35 out of engagement with the pointer hub 37. Upon depressing the button 34, however, the bushing 35 may be engaged with the hub 37, and the frictional engagement may be such as to permit of twisting the pointer around into its proper position or nearly so, whereby the magnetic attraction due to the impulses in the magnet coil 4 will thereafter take control.

If the source 14 is one which produces a 60-cycle current, it is evident that the two synchronous motors 9 and 13 will rotate their spindles synchronously. The armature 8 will then be kept in synchronism with the rotation of the coil 12. Although the armature 8 then rotates so rapidly that its motions could not be visually followed, the pointer 2 remains in whatever position it is forced to take in accordance with the course of the vessel on which the instrument is mounted.

Referring to Fig. 3, the embodiment therein shown comprises indicator elements, the operation of which may be seen to correspond very closely with that hereinbefore described in respect to the embodiment of Fig. 2. In this case, however, the compass needle 38 may itself be made of magnetic material, and it may, if desired, be permanently magnetized. The core member 39 is so formed as to produce lines of force by which the pointer 38 may be caused to take up a definite angular position. The two magnet coils 40 are connected either in series or in parallel to a source of sharply peaked impulses as, for example, one like that shown in Fig.

2. The core and coil structure 39, 40 is continuously rotated by the synchronous motor 41. The impulses for energizing the coils 40 may be transmitted through a circuit which includes the brush 42, the collector ring 43 (which is insulated from the motor shaft 44), through the coils and thence returning by a ground connection 45 onto the shaft of the motor 44. A clip for completing the ground connection is indicated at 46.

No indicator dial has been shown in Fig. 3, but in place thereof the under side of the glass face 47 may have imprinted or engraved thereon any suitable graduations.

The indicator needle 38 may, if desired, be mounted upon a bushing 48 which is carried upon a small spindle 49, the pivot points of which may rest in any suitable bearings 54, one carried at the end of the motor shaft 44 and the other cemented to the under side of the glass instrument face 47.

In the operation of the embodiment shown in Fig. 3 it will be seen that the needle 38 is free to rotate into any position which is determined by the time relationship between the cycles of current operating the motor 41 and the very brief impulses by which the coils 40 are energized, so as to momentarily attract the needle 38 when the armature 39 is in a definite angular position with respect to the directional points of reference.

Figure 4:
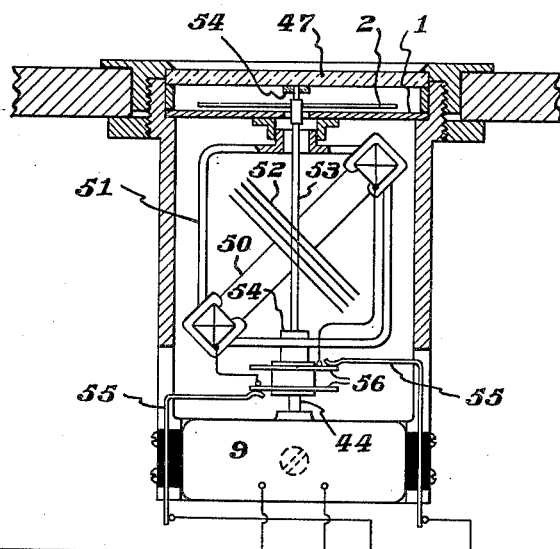
Fig. 4 shows partly in cross-section and partly diagrammatically another embodiment.
Figure 4:
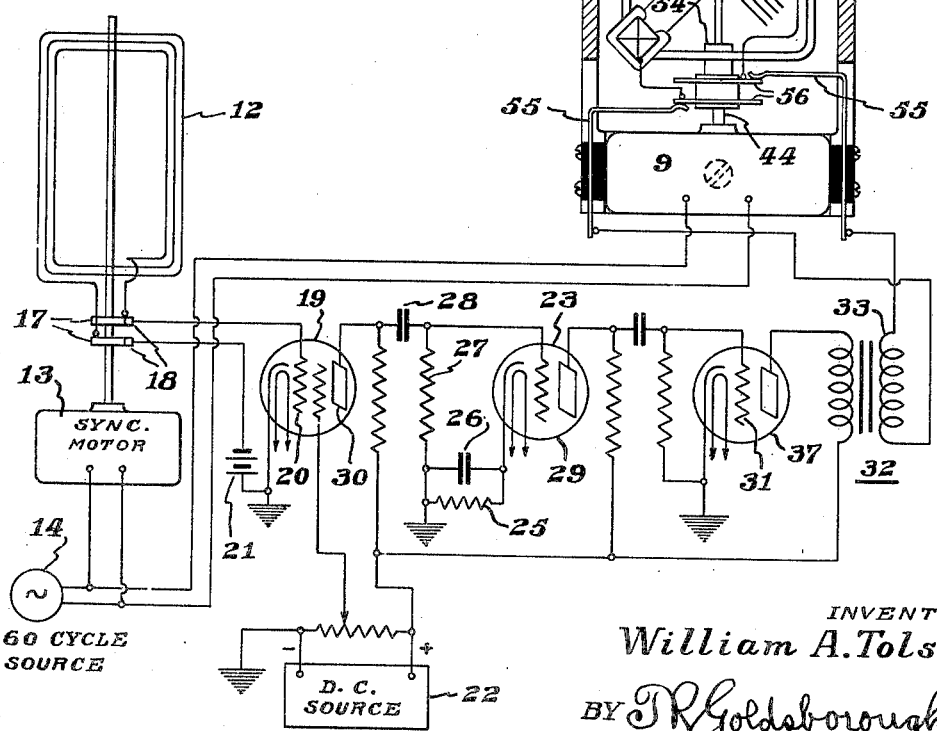

In the embodiment shown in Fig. 4, I have again indicated a synchronous motor 9 for driving a direction determining coil 50. The network for operating this instrument may, if desired, be the same as shown in Fig. 2. The operation of the instrument itself, however, is somewhat different, in that the indicator pointer can not be caused to take a positon 180° out of phase with that which would give the true indication. The coil 50 is mounted on a supporting member 51 at an angle of approximately 45° to the axis of the motor shaft 44. Within the framework of the coil supporting member 51 is mounted an assembly of magnetic plates 52, which are carried on a small spindle 53 rotatable independently of the frame 51. The spindle 53 also carries the indicator pointer 2, and it may be pivoted at the two ends by suitable cup bearings 54, one of which is carried on the motor shaft 44, and the other of which may be cemented to the under side of the glass instrument face 47.

The magnetic vanes 52 may, if desired, be elliptical in shape and sufficiently elongated so that they will be urged into position with the longer axes parallel to the axis of the coil 50. In other positions the vanes lie more or less transverse to the lines of force set up by the coil 50, and the magnetic torque is such as to increase the number of lines of force longitudinally of the vanes. Such a relationship between magnetic vanes and a coil has heretofore been utilized in indicating instruments, but in the prior art heretofore known to the applicant the inclined coil itself was not rapidly rotated as in the manner herein shown.

Impulses from the source 12, when shaped into other impulses of very brief duration, may be applied to the coil 50 through a circuit which includes the brushes 55 and the collector rings 56. Since the impulses applied to this coil 50 are of very brief duration, their effect upon the magnetic vanes 52 for positioning the same will be such as to very accurately determine this position so as to give a proper indication on the pointer 2 with respect to its chart 1. In any relationship other than that of parallelism between the axis of the coil 50 and the longer elliptical axes of the vanes 52, a force will be exerted at the instant when the coil 50 is excited such as to bring about this parallelism. To do so results, of course, in turning the pointer to the correct indicating position.

Referring to Fig. 5, I show a modification of my invention by which the phase relation between any two alternating current sources of like frequency may be determined. It is unnecessary in this case to derive from one of the sources a sharply peaked impulse at one point of each cycle, although such impulses may be used, if desired. It is also unnecessary to provide a synchronous motor such as that shown at 9 in Figs. 1 and 4. In place thereof I show fixed coils 56 and 57 by which a rotating field may be suitably set up having its axis coincident with the axis of rotation of the rotatable magnet 58, 59. The coils 56 may be directly excited by alternating curent from the source herein indicated as source "Y". A 90° phase-shifting device 60 may be introduced into the circuit of the two coils 57. As is well understood by those skilled in the art, this arrangement provides for the setting up of a rotating field in the circular area bounded by the pole pieces 61. The magnet 58, 59 may be mounted on a spindle 62 in such manner that it is free to rotate into whatever position is determined by the phase relation between the lines of force of the rotating magnetic field and the axis of the core 58 at the moment of peak excitation thereof from source "X". Any suitable pointer (not shown) may be carried on the spindle 62, and this pointer may be placed, if desired, over a suitable indicator dial, the details of which are adequately represented in Fig. 1. Current may be supplied to the coils 59 through brushes 63, each of which engages with a different collector ring carried on the spindle 62.

The operation of my invention as embodied according to the showing of Fig. 5 is as follows.

A sine wave current of given frequency from source "X" may be used to energize the magnet 58, 59 twice during each cycle; once with the polarity in one direction and once with this polarity reversed. Simultaneously a sine wave current of substantially the same frequency may be obtained from the source "Y" for so energizing the coils 56 and 57 as to produce lines of force in the region between first one pair and then the other pair of diametrically opposed pole pieces 61. The introduction of the 90° phase shifter 60 into the circuit of the coils 57 provides the proper lead-and-lag relation between the energization of these coils and the coils 56 so that a constantly rotating field results. The instantaneous orientation of this field at the moment when the current from source "X" reaches its peak of one polarity controls the direction in which the north pole of the core 58 will point. This same pole gradually changes from north to south polarity while the rotating field goes through 180° of arc. Hence the magnet 58, 59 tends to remain in a fixed position so long as the phase relation between the two currents X and Y remains unchanged. The magnetic forces of attraction and repulsion, between the stationary pole pieces 61 and the movable magnetic core 58, wax and wane twice during each complete cycle. The setting of the indicator can, therefore, be relied upon to supply an accurate measurement of the electrical phase angle between the two sources X and Y.

Assuming now that the source X supplies sharply peaked impulses of one polarity, then the interaction between the rotating field produced by the current from source Y and the forces exerted by the energization of the magnet 58, 59 will be substantially limited to the duration of the peaked impulses. At other times during each cycle it is true that the lines of force of the rotating field will tend to seek the path of highest permeability, which is through the core 58. Any tendency for the magnet 58, 59 to start spinning like the armature of a synchronous motor is, however, counteracted by the intermittent polarization thereof in response to the pulses from the source "X". Satisfactory operation is, therefore, assured when measuring phase angles in this manner as well as when the current from source X is of substantially sine-wave formation.

Although I have described herein several specific embodiments of my invention, these are given merely by way of example and are not to be considered as limiting the scope of the invention itself. It will be apparent to those skilled in the art that my apparatus may be embodied in other forms and it may be advantageously used in connection with various systems of phase angle indication as well as for direction finding. It is only essential that two sources of alternating current be provided, one for operating the synchronous motor or the substitute therefor as shown in Fig. 5, and the other current for producing sharply peaked impulses whereby to orient the positionable elements including the pointer 2. My invention, therefore, is not to be limited except insofar as is necessitated by the prior art and by the spirit of the appended claims.

I claim as my invention:

1. In an instrument for indicating phase angles, an electrical element adapted to produce a continuously rotative effect in response to cyclic changes in an alternating current impressed thereon from a first source, a magnetizable member mounted for free rotation coaxially with respect to said electrical element, a pointer mounted for rotation with said magnetizable member, a reference scale against which said pointer may be viewed, a second source of alternating current the phase relation of which with respect to the first said source is to be hereby indicated, means for deriving sharply peaked impulses at a particular point in each cycle of current from said second source, and means for producing a momentary cooperation between said electrical element and said magnetizable member in response to said impulses so as to position the pointer directionally.

2. In an instrument for indicating a difference in phase between two alternating currents of substantially like frequency, a synchronous motor adapted to be driven by one of said currents and having a continuously rotatable shaft, a magnetizable member mounted on and rotatable with said shaft, a pointer and pointer-staff pivotally mounted for free rotation on the same axis with, but independenutly of, said motor shaft, a source of sharply-peaked impulses under control of the second of said alternating currents, and means including a magnetizing coil adapted to be energized by said impulses for momentarily so polarizing said magnetizable member as to produce lines of flux in a given direction thereby to position said pointer so as to indicate said difference in phase.

3. An instrument in accordance with claim 2 characterized in that said means including a magnetizing coil include further a magnetic core member for said coil, both the core member and the coil being so mounted, though stationary, as to permit of free rotation of said magnetizable member about the common axis of the latter, the coil and the core member.

4. In a device of the class described, a stationary coil having a magnetizable core, a rotatable magnetic member having its center of rotation aligned with the axis of said core, a motor for driving said rotatable member, means rotatable independently of the first said rotatable member for producing a directional indication, and a magnetic device mechanically linked with said means and adapted to be attracted into a given position in alignment with the poles of the first said rotatable member when said coil is momentarily energized.

5. In a device of the class described, a rotatable coil having its magnetic axis obliquely inclined to its axis of rotation, a motor for driving said coil, a rotatable magnetic device having a longitudinal axis obliquely inclined to its axis of rotation, and being so mounted as to permit of independent rotation within an opening in said coil, a pointer mechanically linked to said magnetic device, a phase indicating dial over which said pointer is adapted to move, and means including a source of sharply peaked impulses for so energizing said coil at a given point in its rotation as to attract said magnetic device into a position of alignment of its longitudinal axis in parallelism with the lines of force through the magnetic axis of said coil.

6. In a device of the class described, means for producing a rotating magnetic field, a magnetizable member mounted for free rotation concentrically with said rotating field, a pointer mechanically linked to said member, a phase indicating dial over which said pointer is adapted to move, and means including a source of sharply peaked impulses for so energizing said magnetizable member as to cause it to assume a position determined by the phase relation between said impulses and said rotating magnetic field.

7. In a device of the class described, means responsive to an alternating current from a first source for producing a rotating magnetic field, a magnetizable member mounted for free rotation concentrically with said rotating field, a pointer mechanically linked to said member, a phase indicating dial over which said pointer is adapted to move, and means including a second source of alternating current for so energizing said magnetizable member as to cause it to assume a position determined by the phase relation between said first and said second sources of alternating current.

WILLIAM A. TOLSON.